Figure 4:
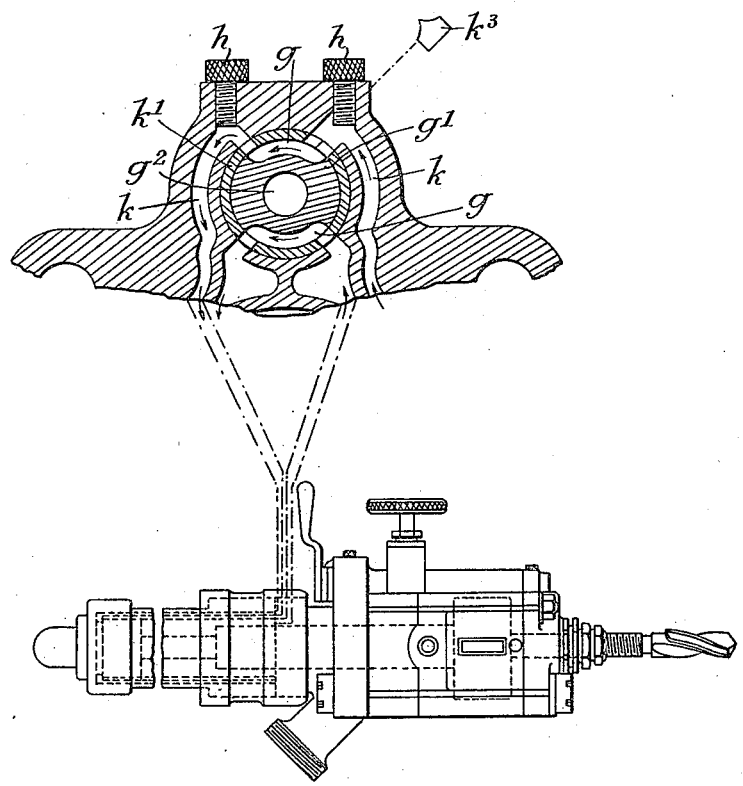

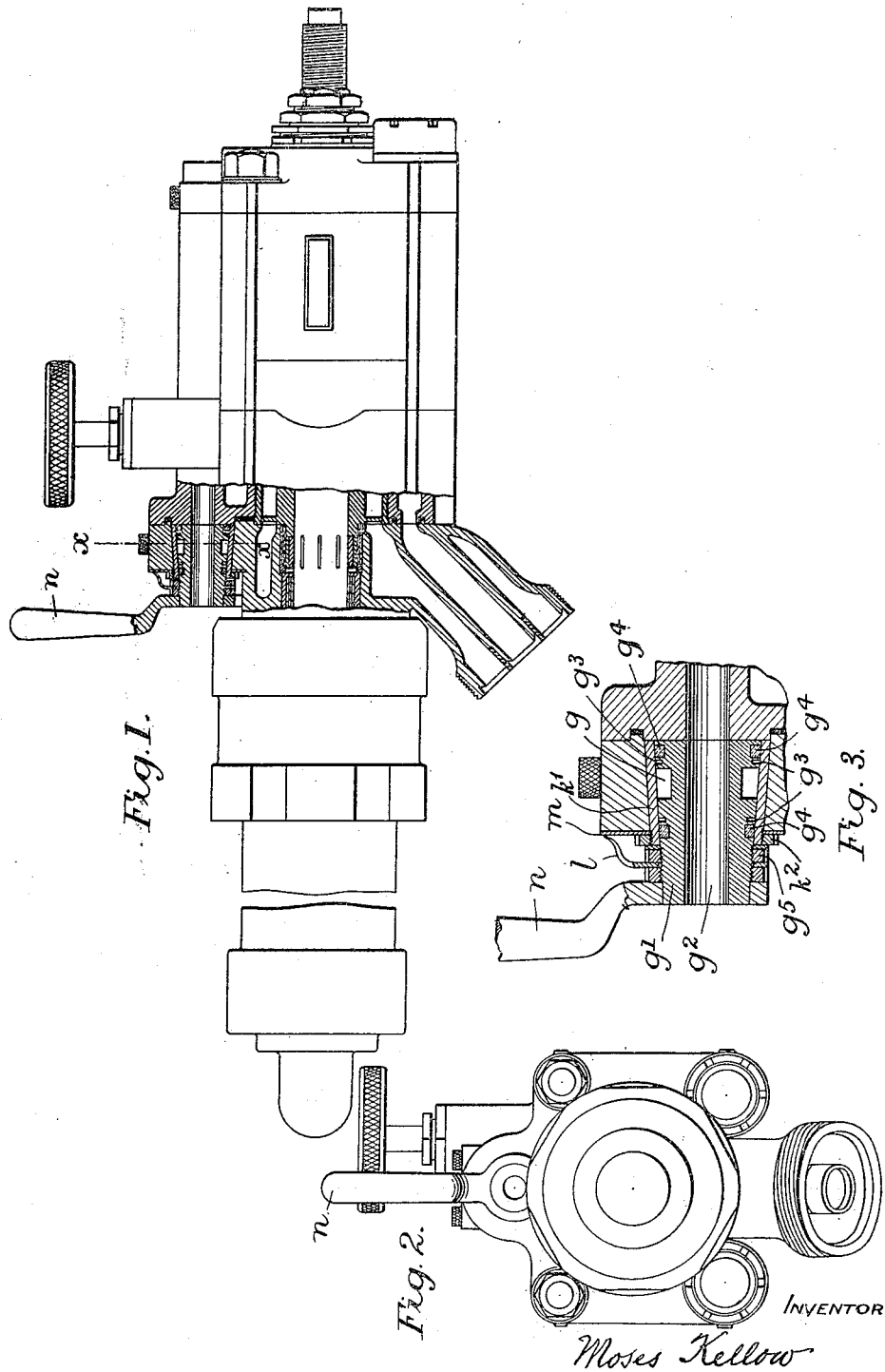

M. KELLOW.
VALVE FOR USE IN THE CONTROL OF POWER DRIVEN ROCK DRILLS.
APPLICATION FILED AUG. 14, 1917.

1,281,787. Patented Oct. 15, 1918.

UNITED STATES PATENT OFFICE.

MOSES KELLOW, OF PENRHYNDEUDRAETH, WALES.

VALVE FOR USE IN THE CONTROL OF POWER-DRIVEN ROCK-DRILLS.

1,281,787. Specification of Letters Patent. Patented Oct. 15, 1918.

Original application filed July 11, 1914, Serial No. 850,455. Divided in part and this application filed August 14, 1917. Serial No. 186,184.

*To all whom it may concern:*

Be it known that I, MOSES KELLOW, a subject of the King of Great Britain and Ireland, residing at Penrhyndeudraeth, in the county of Merioneth, Wales, have invented new and useful Improvements in Valves for Use in the Control of Power-Driven Rock-Drills, of which the following is a specification.

This invention relates to valves for controlling the working of rock-drills of the type wherein a turbine or other suitable hydraulic motor is employed for rotating the drill and wherein the drill is advanced by hydraulic pressure; as, for example, is described in the specification to Letters Patent of the United States granted to me and bearing date the 26th May 1908, No. 888506, the 9th June 1908 No. 890065, and the 26th December 1916, No. 1210326, as also in the specifications to my co-pending applications Serial Nos. 850455, filed July 11, 1914, of which the present application is a division, 139911 and 139912. The present invention consists in certain improvements in the construction and method of mounting the valve for controlling the supply of water under high pressure employed in advancing and withdrawing the drill.

In the accompanying drawings, Figure 1 is a side elevation partly in section and Fig. 2 a back-end view of the drill. Fig. 3 is a longitudinal section and Fig. 4 a transverse section of the control-valve drawn to an enlarged scale. The construction of the drill as a whole and its operation are fully explained in the specifications to my aforesaid copending applications, Serial Nos. 850455, 139911 and 139912.

For controlling the admission of water to the cylinders and piston whereby the drill is advanced and withdrawn, the passages $g$ are, according to my present invention, arranged more symmetrically than in the designs appended to my aforesaid previous patents of 1908; and the plug $g'$ of the controlling device is of such a character as to admit of its being conveniently milled to the required form; the passages $g$ being formed upon the exterior of the plug. Two cheese-headed screws $h$, $h$, are provided in connection with passages $k$, $k$, on either side; and upon either of these screws being removed, a pressure gage can be attached for testing purposes. When applied to the one side, and providing the control-valve is closed so as to prevent the passage of water therethrough, the gage indicates the pressure in the mains; and when attached to the other side, with the control-valve open, as shown in the drawing, it indicates the pressure in the feed-cylinder available for keeping the drill up to its work.

An indicator $l$ is attached to the plug $g'$ in order to show the pressures present in the feed-cylinders corresponding with different positions of the regulating handle $n$. In the present illustration, the control-valve is arranged upon the vertical center line of the drill, and an axial hole $g^2$ is formed in the plug to permit the passage of the usual thrust-rod.

The water passing through the control-valve from left to right, in the position shown in Fig. 4, is utilized for advancing the piston as drilling proceeds, and also for washing the debris out of the bore-hole; the water passing, for this purpose, by way of a passage through the piston, and thence to the hollow drill-rod, as explained in the specification to my co-pending application, Serial No. 139912. If the piston be stationary, with no water passing down the drill-rod, the pressure available in the feed-cylinder and the passage $k$, corresponds with the static head, irrespective of any variation in the extent to which the control-valve is opened; but, with an advance of the piston an escape of water down the drill-rod or both in conjunction this pressure varies with the different degrees to which the said valve is opened. A plate $m$, in front of the indicator $l$, is graduated according to the pressures read off a pressure-gage, and indicates, with sufficient accuracy and without the use of a pressure-gage, the pressures in the feed-cylinder so long as the pressure in the mains continues uniform.

On either side of the passage $g$ in the plug $g'$ (Fig. 3) are formed grooves $g^3$ $g^3$ with the object of intercepting any leakage from the said passages and conveying it away to the general discharge outlet. Beyond these grooves are formed other grooves $g^4$ packed with leather to prevent leakage from either end of the plug $g'$. By these means the provision of a stuffing-box at each end of the plug is avoided, the bulk and weight of the fitting reduced to a minimum, and the friction incidental to the use of packing material diminished.

The leading edge of the passage $k^3$ through the shell $k'$ is V-shaped, as shown in the face view appended to Fig. 4 with the object of enabling the supply of the pressure water for the advancement of the drill to be controlled and of providing against the sudden application of full pressure and the risk of breakage owing to the drill being suddenly projected against the face of the rock.

The shell $k'$ is externally tapered and is a ground-in fit in the surrounding portion of the drill-casing; and by means of the nut $k^2$, the shell $k'$ is drawn tight in its seating and its rotation therein prevented. The interior of the shell $k'$ is also tapered to correspond with the external taper of the plug $g'$, the latter being adjustable in the former by means of the nut $g^5$.

I claim:—

1. In a power-driven rock-drill including a thrust rod, a feed-water controlling device arranged about the thrust-rod and upon the vertical center line of the rock-drill, substantially as set forth.

2. In a power-driven rock-drill, a feed-water controlling device comprising a taper plug formed with two superficial passages and, on either side thereof, an annular groove for intercepting leakage and an annular groove charged with suitable packing, substantially as set forth.

3. In a power-driven rock-drill, a feed-water controlling device comprising a taper plug mounted in, and in combination with, a taper shell, and means for adjusting the former longitudinally in the latter, substantially as set forth.

4. In a power-driven rock-drill, the combinatiton with a feed-water controlling device of the character described, of an indicator operatively connected to the controlling device, a passage at each side of the controlling device adapted to receive a pressure-gage and means for closing said passages.

MOSES KELLOW.

Witnesses:
M. CHALLACOMBE,
C. F. PAYNE.

Copies of this patent may be obtained for five cents each, by addressing the "Commissioner of Patents, Washington, D. C."